United States Patent
Kfir et al.

(10) Patent No.: US 9,854,069 B2
(45) Date of Patent: Dec. 26, 2017

(54) NETWORK SECURITY AGENT

(71) Applicant: RADIFLOW LTD., Tel Aviv (IL)

(72) Inventors: Yehonatan Kfir, Givaat Shmuel (IL); Ilan Barda, Raanana (IL)

(73) Assignee: RADIFLOW LTD., Tel Aviv (IL)

( * ) Notice: Subject to any disclaimer, the term of this patent is extended or adjusted under 35 U.S.C. 154(b) by 0 days.

(21) Appl. No.: 15/328,975

(22) PCT Filed: Dec. 1, 2015

(86) PCT No.: PCT/IB2015/059244
§ 371 (c)(1),
(2) Date: Jan. 25, 2017

(87) PCT Pub. No.: WO2017/093783
PCT Pub. Date: Jun. 8, 2017

(65) Prior Publication Data
US 2017/0195462 A1   Jul. 6, 2017

(51) Int. Cl.
*H04J 3/24* (2006.01)
*H04L 29/06* (2006.01)
*H04L 12/741* (2013.01)
*H04L 12/815* (2013.01)

(52) U.S. Cl.
CPC ........... *H04L 69/04* (2013.01); *H04L 45/74* (2013.01); *H04L 47/22* (2013.01)

(58) Field of Classification Search
CPC .......... H04L 69/04; H04L 47/22; H04L 45/74
See application file for complete search history.

(56) References Cited

U.S. PATENT DOCUMENTS

| | | | |
|---|---|---|---|
| 7,460,516 B1 | 12/2008 | Smith | |
| 8,355,399 B1 | 1/2013 | Wilson | |
| 8,509,237 B2 * | 8/2013 | Akella | H04L 12/4625 370/389 |
| 9,419,803 B2 * | 8/2016 | Teuwen | G06K 7/10267 |
| 2010/0098092 A1 | 4/2010 | Luo | |
| 2010/0329256 A1 * | 12/2010 | Akella | H04L 12/4625 370/392 |
| 2015/0007317 A1 | 1/2015 | Jain | |
| 2015/0341421 A1 | 11/2015 | Chauhan | |
| 2016/0191678 A1 * | 6/2016 | Brandeburg | H04L 63/123 370/392 |
| 2017/0063979 A1 * | 3/2017 | Saeki | G06F 13/12 |

OTHER PUBLICATIONS

International Search Report dated Jul. 12, 2016 for corresponding PCT Application PCT/IB2015/059244 filed Dec. 1, 2015.

* cited by examiner

*Primary Examiner* — Phuc Tran
(74) *Attorney, Agent, or Firm* — A. C. Entis-IP Ltd.

(57) ABSTRACT

A network apparatus comprising: a packet payload compressor (PPC) operable to: receive a packet copied from a network, the packet comprising a source, destination, and a payload; extract a value of a field comprised in the payload; provide a computed value of the field based on the source and destination of the packet; compare the extracted value and the computed value; and compress the field if the extracted value is the same as the computed value, and a traffic shaper operable to transmit a compressed packet comprising the compressed field.

20 Claims, 7 Drawing Sheets

| Modbus TPC frame payload fields | | 8 bits per byte | | |
|---|---|---|---|---|
| Field Name | Function | Compression Category | Length in original packet | Length in compressed packet |
| Transaction identifier (TID) | For synchronization between messages of server & client | Unknown | 2 bytes | 2 bytes |
| Protocol identifier | Zero for Modbus TCP | Constant | 2 bytes | 0 |
| Length field | Number of remaining bytes in this frame | Self-Calculated | 2 bytes | 0 |
| Unit identifier | Slave address (255 if not used) | Self-Calculated (represented in Link ID) | 1 byte | 0 |
| Function code | Function codes as in other variants | Limited (16 or less values) | 1 byte | 4 bits |
| Data bytes | Data as response or commands | Linear Increase | n bytes | 0 |
| Fields added to compressed payload | | | | |
| Payload error status | | N/A | Not in original packet | 2 bits |
| Link ID | | N/A | Not in original packet | 4 bits |
| | | Total bits in payload | 64 + n | 26 |

NETWORK SECURITY AGENT

RELATED APPLICATIONS

The present application is a US National Phase of PCT Application No. PCT/IB2015/059244, filed on Dec. 1, 2015, the disclosure of which is incorporated herein by reference.

TECHNICAL FIELD

Embodiments of the disclosure relate to an apparatus and related method for compressing data in a network.

BACKGROUND

A modern industrial plant is typically a complicated environment comprising an integrated system of automated production equipment, monitoring systems, and computers that control the equipment responsive to data provided by the monitoring systems and human instruction. By way of example, the plant may comprise: production equipment, such as production robots, and chemical reactors; component delivery systems, such as conveyor belts, and pick and place machines; and monitoring systems, such as visual inspection systems and water quality monitors. The various plant components are controlled and monitored in real time to cooperate and automatically perform a production job to which the plant is assigned by control signals transmitted over a plant communication network. Communication devices and computational resources that transmit and receive the control signals through the plant communication network are collectively referred to as an Industrial control system ("ICS"). The control signals are typically in the form of a data packet. A data packet typically includes a header that carries certain types of metadata and routing information in addition to a payload. For convenience of presentation, data packets used in an ICS for control and monitoring of industrial plant components may be referred to herein as industrial protocol ("IndProt") packets.

ICSs were originally programmed with proprietary applications. The proprietary applications did not interface with standard communication network applications and data processing programs that are the backbone of non-industrial communication networks and data systems that are typically used in the home and in non-manufacturing, hereinafter "enterprise", organizations. As a result, ICSs were considered to be relatively immune to any of the various security threats, such as, denial of service attacks, viruses, worms, and unauthorized access, hereinafter referred to generically as "malware", that often compromise software used in the home and enterprise systems.

However, as complexity of automated industrial plants and ICSs that govern them have increased, and the competitiveness of industrial plants has become increasingly dependent on their ability to respond flexibly and rapidly to changing global market conditions, ICSs have become ever more intimately networked with enterprise network systems that use standard software, such as, Ethernet, TCP/IP, HTTP and Windows. As a result, ICSs have become increasingly exposed and sensitive to the same security threats that plague computers and software used in the home and in enterprise systems.

In response to increased exposure to security threats, industrial plants have adopted methods and devices to protect ICSs that are similar to methods and devices, such as various configurations of firewalls, which are used to protect home and enterprise communication networks and data systems.

However, malfunctioning of, and/or down time, in a modern automated industrial plant is generally extremely expensive and can carry substantial liability. Manufacturing components and processes in the plant are interdependent, and typically must operate in synchrony. Malware damage to a component of an automated industrial plant can therefore be amplified well beyond any particular damage to the component, and well beyond what might be sustained by an enterprise communication and data system or home computer data system damaged by the same malware. Thus, Intrusion Detection Systems (IDSs) that detect and respond to anomalies in ICS data traffic indicating malware presence have become a critical element to ensure proper functioning of modern automated industrial plants.

SUMMARY

An aspect of an embodiment of the disclosure relates to a network agent configured to transmit information regarding packet traffic in an ICS network to an IDS hub, the network agent being operable to evaluate an IndProt packet to determine that it has a "surprise-free" payload that contain expected field values, and compress the surprise-free payload, so as to require substantially less ICS network traffic mirrored to the IDS hub compared to conventional network agents. The network agent in accordance with an embodiment of the disclosure may be referred to herein as an "Octopus agent", and an IDS comprising one or more Octopus agents may be referred to as an "Octopus IDS".

In an embodiment of the disclosure, an Octopus agent comprises: a packet payload compressor ("PPC") operable in a first "compression" mode to: receive an Indprot packet copied from a network; extract a value of a field comprised in a payload comprised in the copied packet; provide a computed value of the field based on the copied packet's source and destination; compare the extracted value and the computed value; and compress the field if the extracted value is the same as the computed value, and a traffic shaper operable to transmit a compressed packet comprising the compressed payload field to an IDS hub. In this embodiment, the copied Inpdrot packet may be provided by a network data copier (NDC) operable to copy packets being propagated through the network. Optionally, the NDC comprises a port-mirroring-capable switch comprised in the ICS network or a network tap connected to the ICS network.

For convenience of presentation, a field having an extracted value that matches a computed value may be referred to herein as "having an expected value" or "being an expected field", a field having an extracted value that does not match a computed value may be referred to herein as "having an unexpected value" or "being an unexpected field", and a compressed packet generated by the PPC may be referred to herein as a "PPC packet".

In an embodiment of the disclosure, wherein a copied packet comprises a plurality of field, each of the plurality of fields may be evaluated for possible compression by comparing an extracted value with a computed value.

In an embodiment of the disclosure, a compressed field comprised in a PPC packet is compressed in a way that the field value is reconstructed by an IDS hub receiving the PPC packet.

In an embodiment of the disclosure, the computed value for the field may be generated by the PPC responsive to a dataset, which may be referred to as a field compression category set ("FCCS"), that comprises a plurality of identifiers ("link IDs"), each link ID associated with: (1) a packet source and a packet destination; (2) at least one field identifier, each field identifier corresponding to a field comprised in the packet; and (3) a compression category associated with a link ID and a field identifier. Each compression category may be associated with a rule for determining a computed value of a field of a payload comprised in a copied packet and a rule for how to compress the associated field. The FCCS may optionally be stored in a memory optionally comprised in the PPC or operatively connected to the PPC. In an embodiment of the disclosure, a copy of the FCCS is stored in or operatively connected to an IDS hub, and used by the IDS hub to "decompress" the PPC packets by reconstructing field values of compressed fields in PPC packets responsive to the FCCS copy and information encoded in a compressed packet.

In an embodiment of the disclosure, the PPC may be operable to provide, using a FCCS, at least one computed field value for a field of a copied packet by: extracting the copied packet's source and destination and an identifier of the field; identifying the copied packet with a link ID that is associated in the FCCS with the copied packet's source and destination; assigning the field with a compression category associated in the FCCS with the link ID and the field identifier; and generating the at least one computed field value with a rule associated in the FCCS with the compression category.

In an embodiment of the disclosure, the PPC may be operable, in a second "sampling" mode, to generate a FCCS by: receiving a plurality of packets copied from the ICS network over a period of time ("a sampling session"); binning packets having a same source and destination into a group ("link group") and assign a link ID to the link group; tabulating values of a field comprised in a payload of each packet binned in the link group; and assign a compression category to the field responsive to the set of field values. Optionally, the assigning of the compression category is responsive to a progression of the field values in the set.

In an embodiment of the disclosure, the PPC is operable to alternate between compression and sampling modes. Optionally, the PPC is configured to initially operate in a sampling mode, so that after an Octopus agent comprising the PPC is connected to an ICS network, the PPC creates an initial FCCS categorizing the packets being transmitted between various elements of the ICS network. Optionally, a PPC is configured to transition from the sampling mode to the compression mode after the initial FCCS is generated. Optionally, a PPC is configured to alternate from a compression mode to a sampling mode if the PPC detects unexpected payload field values in one or a pre-determined plurality of copied packets.

In an embodiment of the disclosure, the Octopus agent may further comprise a compressed packet log ("CPL") that receives and saves PPC packets generated by a PPC, and, when triggered, releases at least a portion of the saved PPC packets to a traffic shaper for transmission to an IDS hub.

In an embodiment of the disclosure, the Octopus agent may comprise a distributed computational unit (DCU) that is operable to receive packets from an NDC and optionally extract a feature from the packets to transmit to the IDS hub for analysis towards detecting possible anomalous events ("PAEs"), or optionally to analyze the packets to detect a PAE. In an embodiment of the disclosure, a detection of a PAE by the DCU triggers a CPL to release at least a portion of compressed packets saved therein, optionally packets saved in the CPL between the detection of the PAE and a given period of time prior to the detection.

An aspect of an embodiment of the disclosure relates to a method for reducing volume of data transmitted to from an ICS network to an IDS hub, the method comprising: copying an IndProt packet being propagated through an ICS network; extracting a value of a field comprised in a payload comprised in the copied packet; providing at least one computed value of the field based on a source and destination of the copied packet; comparing the extracted value with the computed value; and compressing the field if the extracted value is the same as the computed value; and transmit a compressed packet comprising the compressed field to an IDS hub.

In an embodiment of the disclosure, providing the at least one computed value comprises: extracting the copied packet's source and destination and an identifier of the field; query a dataset for compression category associated with the source, destination, and field identifier; and generating the at least one computed field value with a rule associated with the compression category.

An aspect of an embodiment of the disclosure relates to a method for generating a FCCS, the method comprising: receiving a plurality of packets copied from an ICS network during a sampling session; binning packets having a same source and destination into a link group and assigning a link ID to the link group; tabulating values of a field comprised in a payload of each packet binned in the link group; and assigning a compression category to the field responsive to the set of field values. Optionally, the assigning of the compression category is responsive to a progression of the field values in the set as a function of the sampling order of the packets in the link group.

In the discussion, unless otherwise stated, adjectives such as "substantially", "relatively" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the specification and claims is considered to be the inclusive "or" rather than the exclusive or, and indicates at least one of, or any combination of items it conjoins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 1:
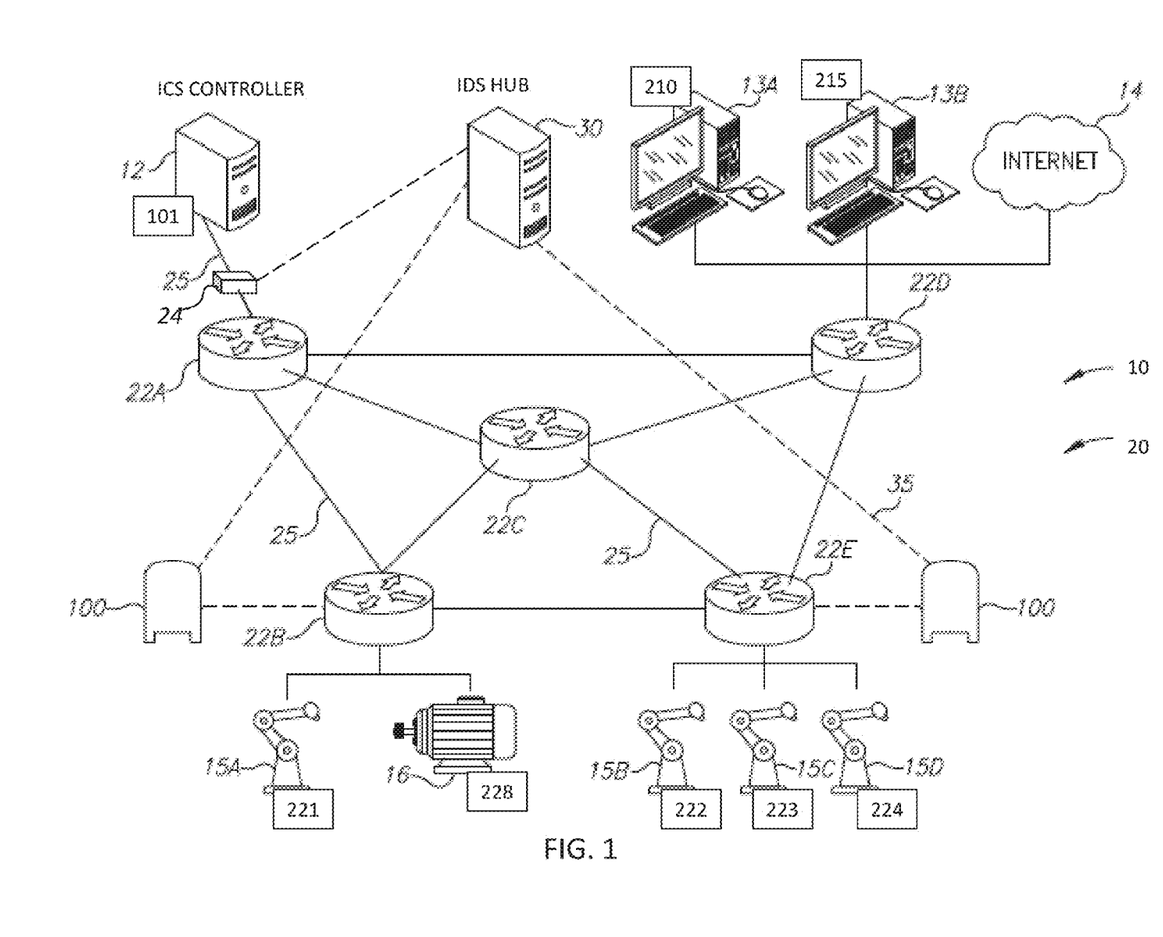
FIG. 1 schematically illustrates an ICS network at a plant having switches comprising an Octopus agent in accordance with an embodiment of the disclosure.

Reference is made to FIG. 1 that schematically illustrates an exemplary industrial plant comprising an ICS 10. ICS 10 comprises an ICS controller 12 and a network 20 comprising five switches 22A-E that connect the ICS controller to network-connectable field devices such as computer workstations 13A-13B, robots 15A-D and a motor 16. ICS network 20 may also connect the field devices to each other, as well as be connected to the internet 14. The network connections of the ICS network are schematically represented as solid lines 25. The ICS 10 may operate under a given industrial protocol, and use ICS network 20 to transmit IndProt packets between ICS controller 12 and the field devices. Each field device connected to the ICS network, including the ICS controller, may be identified with a unique unit identifier in accordance with the given industrial protocol. Examples of industrial protocols include Modbus, DNP3, IEC 60870-5-104 and IEC 61850.

Indprot packets in accordance with the given industrial protocol may encode a unit identifier ("unit ID") in a source field or destination field, as appropriate, in order to transmit IndProt packets to their desired destinations. By way of example, ICS elements shown in FIG. 1 are each assigned a unit ID in accordance with the following chart:

CHART 1

| FIG. 1 ICS element | Unit ID |
| --- | --- |
| ICS controller 12 | 101 |
| Computer workstation 13A | 210 |
| Computer workstation 13B | 215 |
| Robot 15A | 221 |
| Robot 15B | 222 |
| Robot 15C | 223 |
| Robot 15D | 224 |
| Motor 16 | 228 |

Network 20 may comprise a network tap 24 that copies packets traversing a network connection 25 between ICS controller 12 and switch 22A, and transmits the copied packets to IDS hub 30. Additionally or alternatively, network 20 may comprise one or more switches (switches 22B and 22E as shown in FIG. 1) that port mirrors packets that traverse the respective switches and transmit the copied packets to IDS hub 30. The transmission of packets copied from network 20 to IDS hub 30 is schematically represented as dashed lines 35. An Octopus agent 100 in accordance with an embodiment of the disclosure may be configured to intercept transmission of copied packets from a network tap or port mirroring switch, compress the copied packets, and transmit the compressed packets to IDS hub 30.

In an embodiment of the disclosure, as shown in FIG. 1, transmission of port-mirrored packets from each of switches 22B and 22E, which are relatively remote from ICS controller 12 and IDS hub 30, are respectively intercepted by an Octopus agent 100 before continuing, in compressed form, to IDS hub 30, and transmission of copied packets from network tap 24, which is situated relatively in proximity to ICS controller 12 and IDS hub 30, is not intercepted by an Octopus agent.

Figure 2:
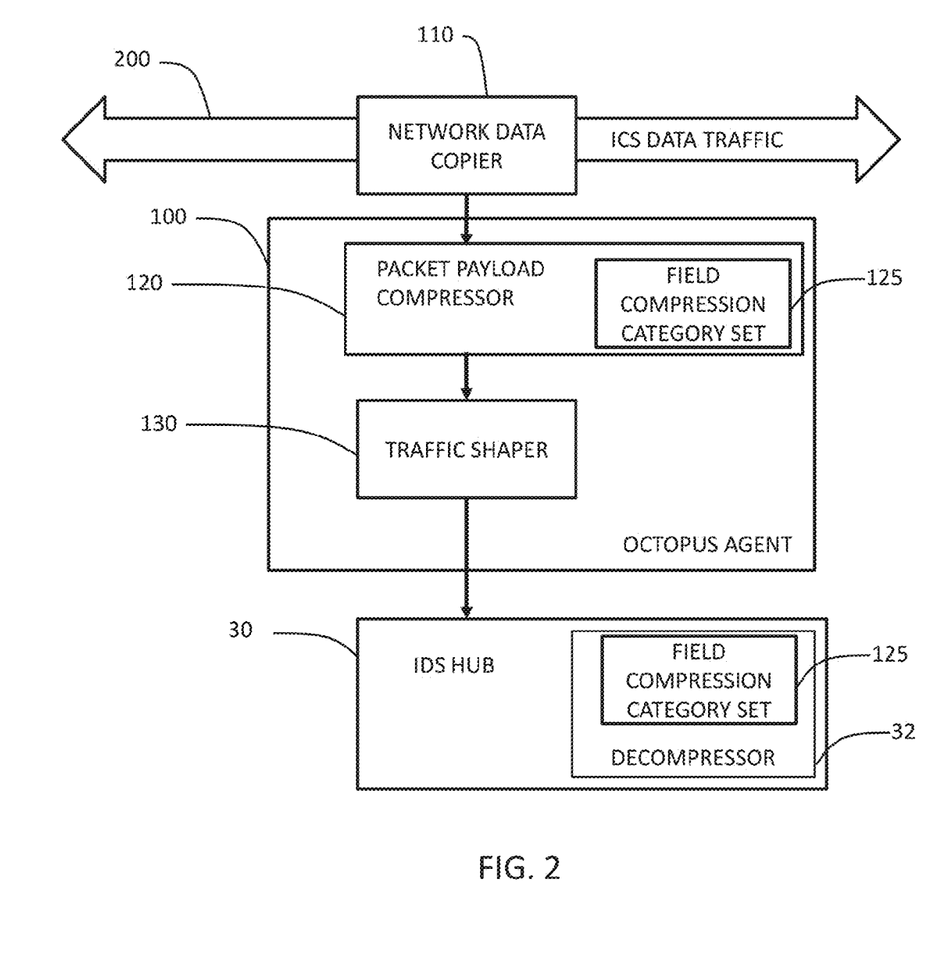
FIG. 2 schematically illustrates, as a block diagram, an Octopus IDS comprising an Octopus agent and an IDS hub in accordance with an embodiment of the disclosure.

Reference is made to FIG. 2 that schematically illustrates, as a block diagram, an Octopus agent 100 in accordance with an embodiment of the disclosure. In an embodiment of the disclosure, Octopus agent 100 comprises a PPC 120 operable in a compression mode to evaluate and compress at least one field comprised in a payload of a copied IndProt packet and a traffic shaper 130 operable to transmit a compressed packet comprising the compressed payload field to IDS hub 30, which may comprise a decompressor 32 operable to decompress the compressed packet. The copied Inpdrot packets may be provided by an NDC 110 operable to copy packets being propagated through an ICS network data traffic, schematically represented as open double arrow 200. Optionally, NDC 110 comprises a port-mirroring-capable network switch (for example switch 22 shown in FIG. 1) comprised in an ICS network (for example ICS network 20 shown in FIG. 1) or a network tap connected to the ICS network.

In an embodiment of the disclosure, PPC 120 may generate the computed field value and/or compress a field responsive to an FCCS 125, as described further hereinbelow. In an embodiment of the disclosure, decompressor 32 may decompress a compressed packet responsive to FCCS 125, as described further hereinbelow. Optionally, PPC 120 comprises a packet filter (not shown) operable to select IndProt packets, which are directed to payload compression.

Figure 3:
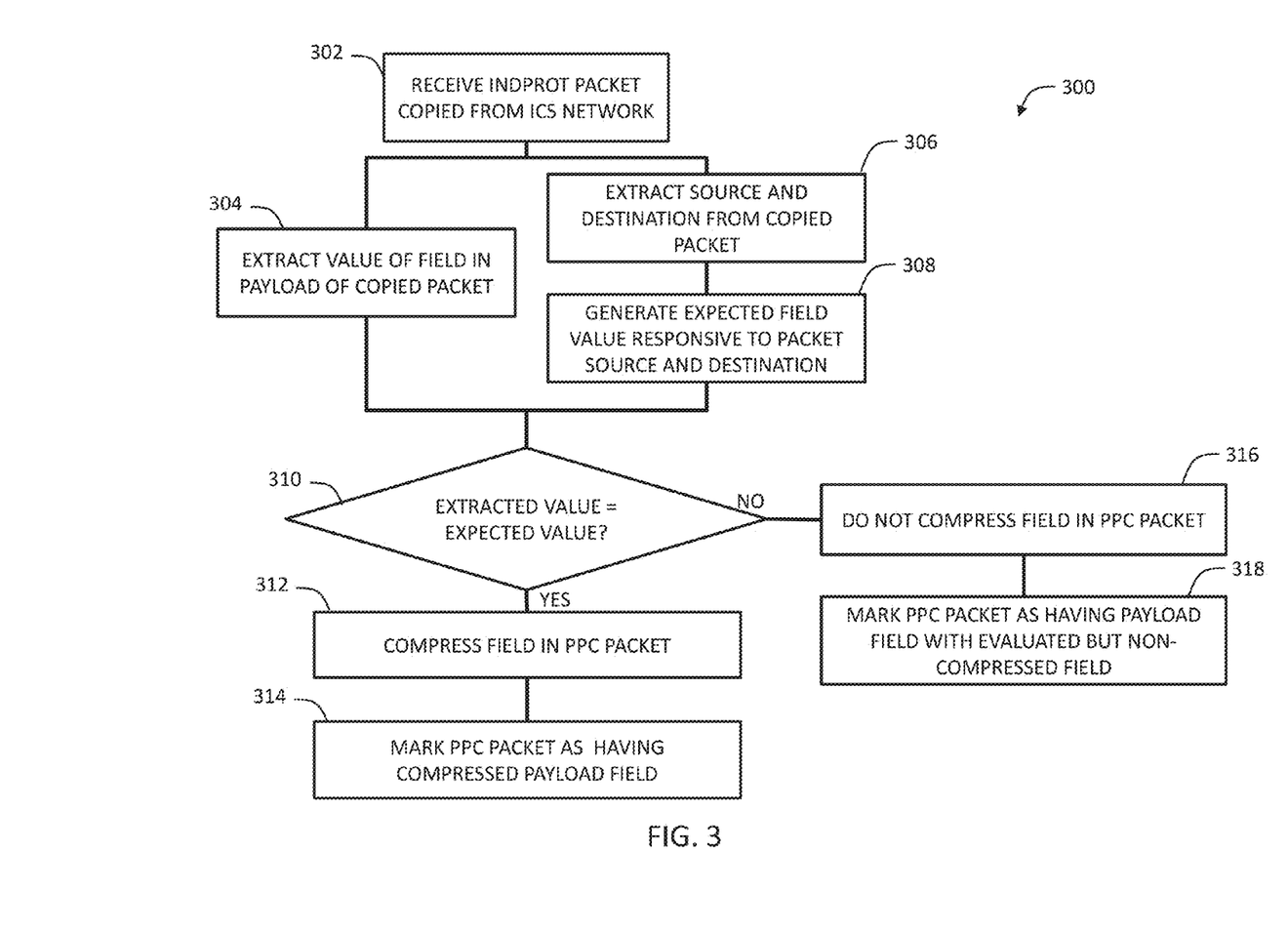
FIG. 3 is a flowchart showing an operation for compressing a packet payload performed by a PPC comprised in an Octopus agent in accordance with an embodiment of the disclosure.

Reference is now made to FIG. 3. In an embodiment of the disclosure, the PPC is operable to perform a payload compression procedure 300: receive a copied IndProt packet from the NDC (block 302); extract a value of a field comprised in a payload comprised in the copied packet (block 304); extract a source and destination of the copied packet (block 306); generate a computed value of the field based on the source and destination (block 308); and compare the extracted field value and the computed field value (decision block 310). If the extracted value is the same the computed value, then the PCC compresses the field (block 312), and optionally marks the packet as having a payload comprising a compressed field i (block 314). Alternatively, if the extracted value does not match the computed value, then the PPC does not compress the field (block 316), and optionally marks the packet as comprising a payload field that was evaluated for possible compression by the PPC but not compressed (block 318).

In an embodiment of the disclosure, the computed value for the payload field may be generated by the PPC using a FCCS (by way of example FCCS 125 shown in FIG. 2) that comprises a plurality of link IDs, each link ID associated with: (1) a packet source and a packet destination; (2) at least one field identifier corresponding to a payload field comprised in the packet; and (3) a compression category associated with the link ID and a field identifier of the at least one field identifier. The field identifier is optionally a location of the field in the packet expressed as an offset of bits or bytes from a start of the payload, a field name within the payload ("a field name"). The FCCS may optionally be stored in a memory comprised in the PPC or operatively connected to the PPC. In an embodiment of the disclosure, a copy of the FCCS may be stored in an IDS hub (for example IDS hub 30 shown in FIG. 1) and used by the IDS hub for reconstructing compressed packets received from an Octopus agent.

In an embodiment of the disclosure, a payload field may be categorized as one of a plurality of compression categories, which may include two or more of the following compression categories listed below:

A "Constant" field in which the field value is a constant value.

A "Linear Increasing" field in which the field value increases at a constant increment each time a packet having a given Link ID is sampled.

A "Linear Decreasing" field in which the field value decreased at a constant increment each time a packet having a given Link ID is sampled.

A "Changing slowly" field in which the change in a field's value between each time a packet having a given Link ID is sampled is limited to a maximum value.

A "Limited" field in which the field value is limited to one of a predetermined selection of values.

A "Self-Calculated" field that can be calculated from at least one other field in the packet.

An "Unknown" field having values that cannot be fitted to another compression category.

Below, shown as Chart 2, is a portion of an exemplary FCCS based on the exemplary industrial plant shown in FIG. 1, with the source and destination being the Unit IDs of the ICS elements shown in FIG. 1 and listed in Chart 1 hereinabove.

CHART 2

| Link ID | Source/ Destination | Payload field name | Compression category |
|---|---|---|---|
| 0010 | 101/221 | A | Constant |
|  |  | B | Linear Increase |
|  |  | C | Constant |
|  |  | D | Limited |
| 0011 | 221/101 | A | Constant |
|  |  | B | Linear Decrease |
|  |  | C | Self-Calculated |
| 0012 | 101/222 | A | Unknown |
|  |  | B | Slow Changing |
|  |  | C | Constant |
|  |  | D | Constant |
| 0013 | 222/101 | A | Linear Increasing |
|  |  | B | Self-Calculated |
|  |  | C | Limited |

In an embodiment of the disclosure; each compression category may be associated, in the FCCS or another data set that is stored in for operatively connected to the PPC, with: (1) a rule (a "expectation rule") for determining a computed value of a field; (2) a rule (a "compression rule") for how to compress a field that has an expected value.

In an embodiment of the disclosure, the PPC may be operable to provide the computed field value for a field of a copied packet, based on a FCCS, by: extracting the copied packet's source and destination; identifying the copied packet with a link ID that is associated in the FCCS with the copied packet's source and destination; identifying a compression category for a payload field comprised in the identified packet with a compression category that is associated with the link ID and in the FCCS; and generating the computed field with an expectation rule associated with the compression category. In an embodiment of the disclosure, if the evaluated field is determined to have an expected value, then the field may be compressed in accordance with a compression rule associated with the compression category.

Chart 3 below provides a list of exemplary expectation rules and compression rules associated with each of a selection of compression categories. For the expectation rules listed below, Let $V_{COM}$=computed field value, $V_0$=an initial field value, N=a counter value tracking the number of times a packet having a same Link ID was received by the PPC, I=an increment value, $V_P$=an extracted field value from the previous instance when a packet having a same LinkID was received by the PPC, MC=a maximum change value, $f$=a function; and OV=a value of another field comprised in the packet.

CHART 3

| Compression Category | Expectation Rule | Field Compression Rule |
|---|---|---|
| Constant ("C") | $V_{COM} = V_0$ | Compress to 0 bits |
| Linear Increasing ("LI") | $V_{COM} = V_0 + I(N)$ | Compress to 0 bits |
| Linear Decreasing ("LD") | $V_{COM} = V_0 - I(N)$ | Compress to 0 bits |
| Changing Slowly ("CS") | $V_P - MC < V_{COM} < V_P + MC$ | Encode difference between the extracted value and $V_P$ |
| Limted ("L") | $V_{COM} = \{V_1, V_2, V_3 \ldots V_N\}$ | Encode selection from set of values |
| Self-Calculated ("SC") | $V_{COM} = f(OV_1, OV_2, OV_3 \ldots OV_N)$ | Compress to 0 bits |
| Unknown ("U") | No Expectation | Do not compress |

By way of example, a payload field may be compressed as per a field compression rule listed in Chart 3 above. Optionally, C, LI and LD fields are compressed to 0 bits. A payload field that is compressed to 0 bits may not be included in the compressed packed. Optionally, a U field is not compressed. Optionally, a Limited field is compressed to a number representing a selection from a set of possible values $\{V_1, V_2, V_3 \ldots V_N\}$. By way of example, where $N<=16$, the selection may be encoded in a 4-bit compressed field. Optionally, a CS field is compressed to a value of the difference between an extracted value and $V_P$. By way of example, if the difference consistently no more than 16, then the difference value may be encoded in a 4-bit compressed field.

In an embodiment of the disclosure, a compressed payload may comprise additional fields not comprised in the copied packet. Optionally, the compressed payload comprises a "payload error status" field having a value encoding whether or not a copied packet's payload comprised a field having an unexpected value. By way of example, the payload error status may be a 2-bit field where a value of "11" identifies an "error-free" compressed packet as one in which all of the payload fields have an expected value, and a value of "10" identifies an "erroneous" compressed packet as one in which at least one of the payload fields has an unexpected value. Optionally, the compressed payload comprises a Link ID field that records the Link ID assigned to the copied packet by the PPC. Optionally, the compressed payload comprises payload structure field listing an order of fields in the payload of the copied packet. In an embodiment of the disclosure, above additional fields may be used by a decompressor in an IDS hub receiving the compressed packet to reconstruct the compressed payload fields.

Figure 4:
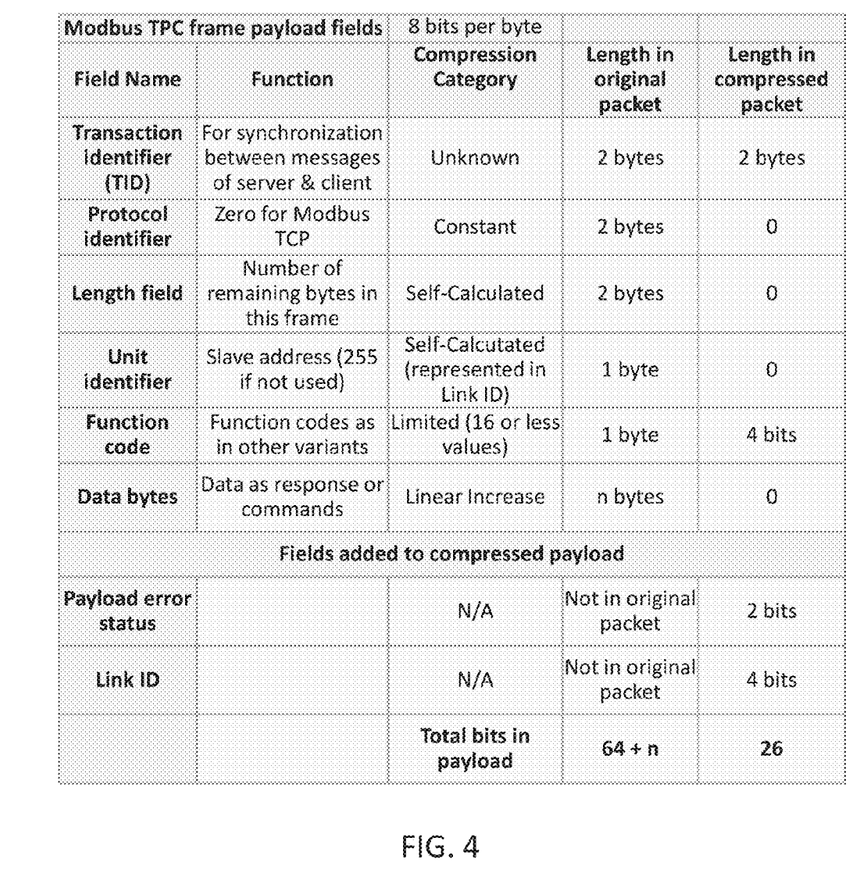
FIG. 4 shows a table with an example of a packet payload before and after compression by a PPC in accordance with an embodiment of the disclosure.

FIG. 4 shows a table with an example of a payload in a Modbus TPC frame before and after compression by a PPC in accordance with an embodiment of the disclosure. A payload in Modbus TPC frame typically comprises the following fields: a 2-byte Transaction identifier (TID) field; a 2-byte protocol identifier field; a 2-byte Length field; a 1-byte Unit identifier field; a 1 byte Function code field; and a Data bytes field that has a variable length (n bytes), each byte comprising 8 bits. Each field is assigned a compression category and fields comprising an expected value are compressed accordingly, in accordance with an embodiment of the disclosure. All fields in the exemplary packet comprise an expected field value. Consequently, the TID field is an Unknown field that is not compressed, the Protocol field is a Constant field that is compressed to 0 bits, the Length field is a Self-Calculated field compressed to 0 bits, the Unit identifier field is a Self-Calculated field compressed to 0 bits, the Function code field is a Limited field compressed to 4 bits, and the Data bytes field is a Linear Increasing field compressed to 0 bits. The compressed packet comprises two additional fields: a 2-bit Payload error field, and a 4-bit Link ID field. While the payload in the original packet was 64+n bits long, the payload in the compressed packet is 26 bits long.

In an embodiment of the disclosure, compressed packets may be reconstructed by a decompressor after being received by an IDS hub, and the decompressor may use information encoded in the compressed packet, and expectation rules comprised in an FCCS copy stored in the decompressor, for field reconstruction. In an embodiment of the disclosure, C, LI and LD compression categories do not require a field value to be comprised in the compressed packet to be fully reconstructed by a decompressor comprised in the IDS. The decompressor may reconstruct a C field by retrieving a $V_0$ value from an associated expectation rule comprised in the FCCS copy. The decompressor may reconstruct a LI or LD field by retrieving V0 and I values from the associated expectation rule, and retrieving N from a counter tracking the number of times a compressed packet having a same Link ID was previously received by the IDS hub. A CS field may be reconstructed by adding a $V_P$ stored in the decompressor with a difference value encoded in the compressed packet. An L field may be reconstructed by referring to the set $\{V_1, V_2, V_3 \ldots V_N\}$ store in the FCCS and the selection from the set encoded in the compressed packet.

Figure 5:
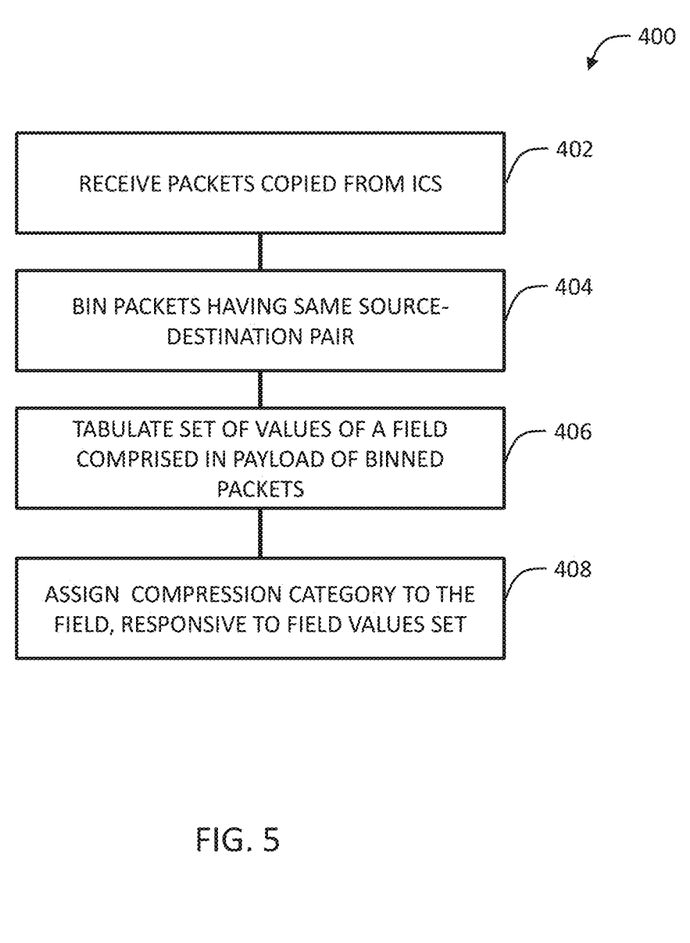
FIG. 5 is a flowchart showing an operation for generating a field compression category set performed by a PPC comprised in an Octopus agent in accordance with an embodiment of the disclosure.

Reference is now made to FIG. 5. In an embodiment of the disclosure, the PPC may be operable, in a sampling mode, to generate a FCCS by: sampling a plurality of packets copied from the ICS network over a period of time ("a sampling session") (block 402); binning packets having a same source and destination into a group ("link group") (block 404) and assigning a link ID to the link group; tabulating values of a field comprised in a payload of each packet binned in the link group (block 406); and assigning a compression category to the field responsive to the set of field values (block 408). Optionally, the assigning of the compression category is responsive to a progression of the field values in the set as a function of the sampling order of the packets in the link group.

By way of example, with reference to FIG. 1, Modbus packets being transmitted within ICS network 20 are recorded during a sampling session. During the sampling session, fifteen Modbus packets were transmitted from ICS controller 12 to motor 16. These fifteen packets are binned into one link group and assigned a Link ID. For each payload field (TID, Protocol identifier, Length field, . . . Data byte) in the link group, the values are tabulated. Each tabulated set of values representing a sequence of values in one field is analyzed by a series of classifiers to assign a compression category. By way of example, the sequence of values for the Data byte field in the link group is {10, 0, 25, 200, 200, 25, 0, 0, 10, 0, 10, 25, 200, 200, 200}. The Data byte field does not conform to classifier requirements to be classified as Constant, Linear Increasing, Linear Decreasing, or Changing Slowly. The Data byte field is also found to not be Self-Calculated, because the values of the field cannot be related by a function to other fields in the packet. The Data byte field value is determined to be limited to four values, and is categorized as a Limited field having an expectation rule of $V_{COM}=\{0, 10, 25, 200\}$. A similar process is repeated for all payloads fields in the binned packets in the same link group. The classification process is further repeated for each group of packets binned into other link groups, thus resulting in a FCCS representing all packets sampled from ICS network 20 during the sampling session. The newly generated FCCS is stored in the PPC for compression subsequent packets received by the PPC, and a copy of the FCCCS is transmitted to IDS hub 30 for storage in and use by decompressor 32 to reconstruct subsequently received compressed packets after the PPC alternates to a compression mode.

In an embodiment of the disclosure, PPC 120 is operable to alternate between a first mode for compressing packets responsive to an FCCS and a second mode for sampling packets and generating a new FCCS. Optionally, PPC 120 is configured to initially operate in the second mode, so that after an Octopus agent 100 is connected to ICS network 20, PPC 120 creates a new FCCS, and then alternate to the first compression mode after the new FCCS is created. Optionally, PPC 120 during the first compression mode is operable to keep count of compressed packets ("error packets") generated having a payload error status indicating a field in which an extracted value did not match a computed value, and is operable to alternate to the second sampling mode when the count of error packets exceed a predefined threshold. By way of example, if the Data byte field comprised in the payload of Modbus packets transmitted from ICS controller 12 to motor 16 were previously characterized as being a Limited field having an expectation rule of $V_{COM}=\{0, 10, 25, 200\}$, but subsequent packets from ICS controller 12 to motor 16 started to include Data byte field values of 30, PPC 120 would eventually alternate to another sampling mode and generate a new expectation rule that includes a field value of 30 as a possible computed value.

Figure 6:
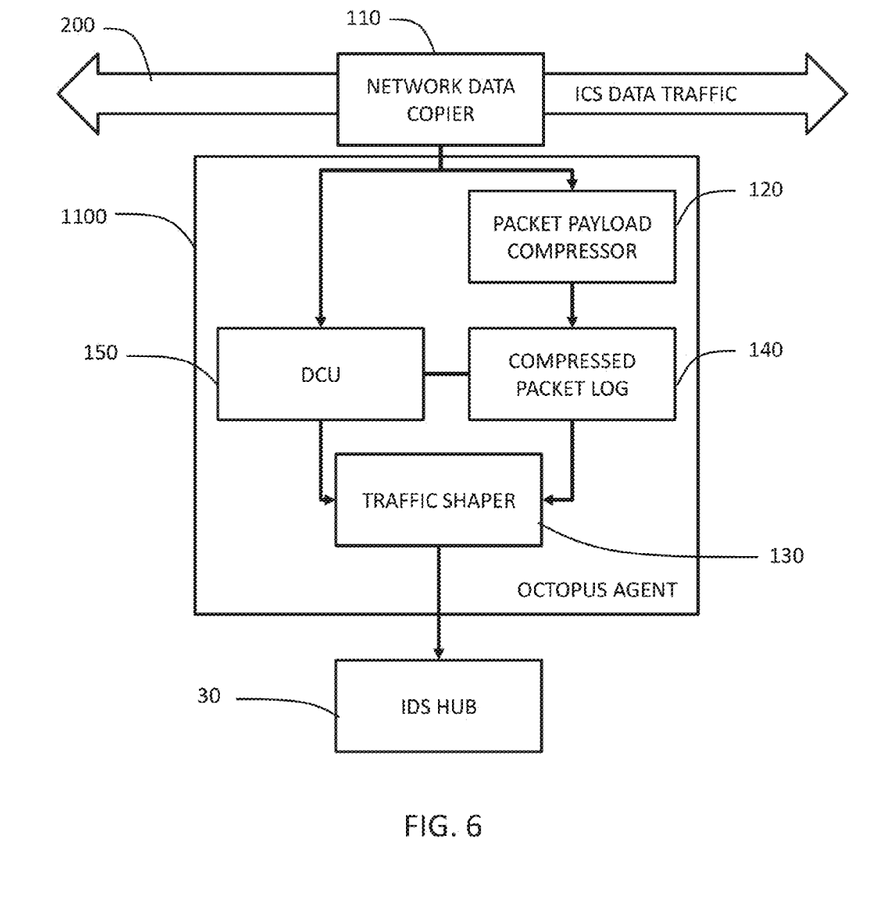
FIG. 6 schematically illustrates, as a block diagram, an alternative Octopus agent comprising a DCU, in accordance with an embodiment of the disclosure.

Reference is now made to FIG. 6, which schematically illustrates an Octopus agent 1100 in accordance with and embodiment of the disclosure that is similar to Octopus agent 100, but further comprise a compressed packet log ("CPL") 140 that receives and saves PPC packets generated by PPC 120, and, when triggered, releases at least a portion of the saved PPC packets to traffic shaper 130 for transmission to IDS hub 30. In an embodiment of the disclosure, release saved packets by CPL 140 may optionally be triggered by a given time period, a number of compressed packets received by the CPL. In an embodiment of the disclosure, release of saved packets by CPL 140 may be triggered by a signal comprised in a compressed packet generated by PPC 120, the signal optionally being a payload error status indicating that the payload comprises a field in which an extracted value did not match a computed value. In an embodiment of the disclosure, CPL 140 is triggered to release saved PPC packets with, optionally, a signal from a source external to the PPC or a signal from a source external to the Octopus agent. Optionally, the CPL is a cyclic log in which, after a certain memory threshold is reached, earlier-saved packets are deleted to make more memory available to save newly received packets.

In an embodiment of the disclosure, Octopus agent 1100 may comprise a distributed computational unit ("DCU") 150 that is operable to receive packets from NDC 110 and analyze the packets for the purpose of detecting possible anomalous events ("PAEs"). In an embodiment of the invention, Octopus agent 1100 comprises DCU 150 and not PPC 120.

In an embodiment of the disclosure, DCU 150 is operable to extract a feature (an "anomaly detection feature") useful for anomaly detection from packets received from NDC 110, and transmit the anomaly detection feature to IDC hub 30 for analysis to detect PAEs.

In an embodiment of the disclosure, copied packets from NDC 110 may be transmitted to both PPC 120 and DCU 150 in parallel. In this embodiment, for a given copied packet, DCU 150 extracts an anomaly detection feature from the copied packet, PPC 120 compresses a payload from the copied packet. Optionally, the anomaly detection feature and the compressed payload are then packaged into a packet by traffic shaper 130 and transmitted to IDS hub 30.

Figure 7:
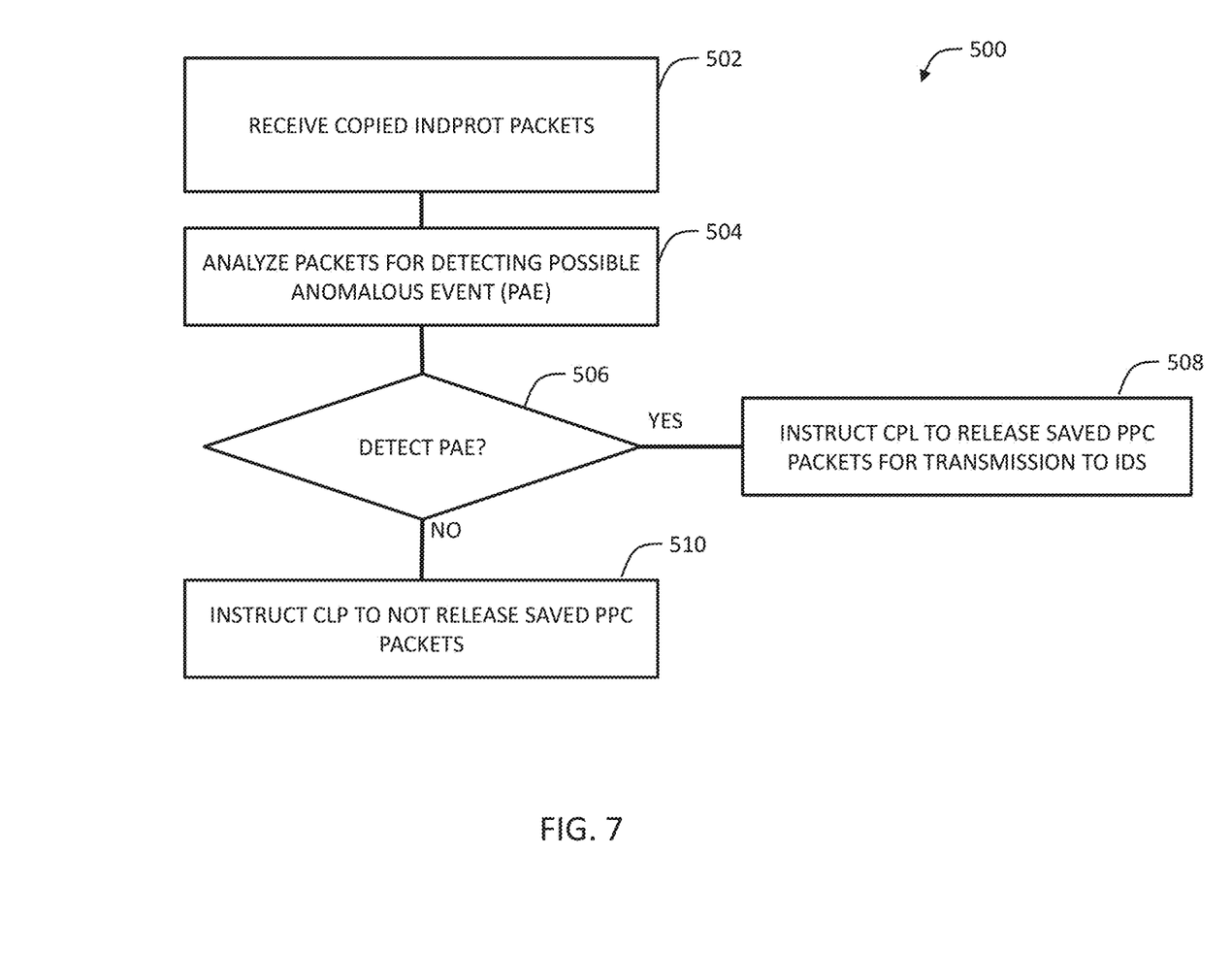
FIG. 7 is a flowchart showing an operation for controlling transmission of compressed packets performed by a DCU comprised in an Octopus agent in accordance with an embodiment of the disclosure.

Reference is now made to FIG. 7. In an embodiment of the disclosure, DCU 150 operable perform a gatekeeping procedure 500 for compressed packets stored in CLP 140. In the gatekeeping procedure, DCU 150 receives a plurality of copied packets (block 502), extracts at least one anomaly detection feature from the plurality of copied packets and store a plurality of anomaly detection features, and analyzes the plurality of anomaly detection feature to detect a PAE (block 504). If a PAE is detected, DCU 150 optionally sends a PAE notification to the IDS hub, and/or sends a signal to trigger CPL 140 to release compressed packets save therein to be transmitted by traffic shaper 130 to the IDS hub (block 508). If a PAE is not detected, the DCU 150 optionally sends a notification of a lack of a PAE to the IDS hub, and does not instruct CPL 140 to release saved compressed packets (block 510).

In an embodiment of the disclosure, PAE detection procedures in which DCU 150 is operable to participate may include: packet integrity checking, statistical anomaly detection ("SAD"), and active ICS monitoring, as described hereinbelow.

Transmitted packets may be checked for integrity, meaning that the packet is evaluated for detecting errors or changes that may have been introduced during transmission and/or storage. The evaluation typically performed on a packet for this purpose is to compute a checksum for the packet. A typical procedure for checking packet integrity is to mirror packet traffic from several locations in a network, compute the checksum for the respective packets and compare the checksum of a same packet copied from different network locations. If the contents of the packet were accidentally or maliciously changed while traversing the network, the checksum would be different. In an embodiment of the disclosure, the anomaly detection feature may comprise a checksum computed from a copied packet. In this embodiment, DCU 150 is operable to compute a checksum for copied packets for non-variant fields of the copied packets. Optionally, DCU 150 is further operable to transmit the computed checksum of the copied packets for comparison in the IDS hub for detection of a PAE. Optionally, DCU 150 is operable to compare the compute checksums, and a change in the checksum for non-variant fields of the copied packets is determined by DCU 150 to be a PAE.

ICS networks present a relatively stable communication pattern, in which rates of packets being transmitted between ICS elements, like between an ICS controller and a field device, or between field devices, is relatively constant. In a typical ICS network, rates of packet transmission between field devices remain particularly stable over time. A statistical anomaly detection ("SAD") engine, which may be comprised in an IDS hub, establishes a baseline transmission frequency for packets being transmitted, by way of example, from a given device address, being transmitted to a given device address, and/or transmitted between a given pair of device addresses. A change in a packet transmission frequency from the baseline frequency may indicate an anomaly. SAD traditionally requires all the packets in an ICS network to be sent to a central IDS hub, which may overload the network serving the IDS hub.

In an embodiment of the disclosure, an anomaly detection feature may comprise a device address extracted from a copied packet. In this embodiment, DCU 150 is operable to extract one or more device addresses from a copied packet, and the extracted device addresses may be transmitted by traffic shaper 130 to IDS hub 30 for PAE detection analysis. Optionally, DCU 150 is operable to perform deep packet inspection (DPI) on the copied packets, and identify device address(es) encoded in the copied packets.

Alternatively or additionally, DCU 150 is operable as a SAD engine to analyze device addresses extracted from a plurality of copied packets to establish packet transmission rate baselines and analyze packet transmissions rates for deviation from the baseline. In an embodiment of the disclosure, a detection of a deviation beyond a predetermined threshold is determined by DCU 150 to comprise detection of a PAE.

Some PAE detection procedures are passive, in which the Octopus agent is able to work in a one-way-link that allows interception and copying of ICS elements but not transmission of packets to an ICS element. Other PAE detection procedures require active interrogation of an ICS element. In an embodiment of the disclosure, DCU 150 may be operable to actively request for and receive an ICS controller's configuration. A change in the ICS controller configuration may be determined by DCU 150 to comprise detection of a PAE.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments of the disclosure. Some embodiments utilize only some of the features or possible combinations of the features. Variations of embodiments of the disclosure that are described, and embodiments of the disclosure comprising different combinations of features noted in the described embodiments, will occur to persons of the art. The scope of the invention is limited only by the claims.

The invention claimed is:

1. A network apparatus comprising:
    a packet payload compressor (PPC) operable to:
        receive a packet copied from a network, the packet comprising a source, destination, and a payload;
        extract a value of a field comprised in the payload;

provide a computed value of the field based on the source and destination of the packet;

compare the extracted value and the computed value; and compress the field if the extracted value is the same as the computed value, and a traffic shaper operable to transmit a compressed packet comprising the compressed field.

2. The network apparatus in accordance with claim 1, wherein the computed value is determined responsive to data in a dataset that comprises a plurality of link identifiers (link IDs), each link ID associated with:

a packet source and a packet destination;

at least one field identifier; and a compression category associated a field identifier of the at least one identifier.

3. The network apparatus in accordance with claim 2, wherein the compression category is associated with a rule for determining the computed value.

4. The network apparatus in accordance with claim 2, wherein the compression category is associated with a rule for how to compress the field.

5. The network apparatus in accordance with claim 2, wherein the PPC is operable to provide the computed value by:

extracting the copied packet's source and destination and the identifier of the field;

identifying the copied packet with a link ID that is associated in the dataset with the copied packet's source and destination;

assigning the field with a compression category associated in the dataset with the link ID and field identifier; and generating the computed field value with a function associated with the compression category.

6. The network apparatus in accordance with claim 5, wherein the function generates a same value each time a new packet identified with the link ID is received by the PPC.

7. The network apparatus in accordance with claim 5, wherein the function is a linearly increasing function that increases each time a new packet identified with the link ID is received by the PPC.

8. The network apparatus in accordance with claim 5, wherein the function is a linearly decreasing function that decreases each time a new packet identified with the link ID is received by the PPC.

9. The network apparatus in accordance with claim 5, wherein the function increases or decreases within predefined limits each time a new packet having the Link ID is received by the PPC.

10. The network apparatus in accordance with claim 5, wherein the function is a discrete function assuming values from a limited set of discrete values.

11. The network apparatus in accordance with claim 5, wherein the function is a function of the value of more than one field in the packet.

12. The network apparatus in accordance with claim 2, wherein the PPC is operable to generate a new dataset by:

receiving a plurality of packets copied from the network over a period of time;

binning packets having a same source and destination in a same bin;

assigning a link ID to bin;

extracting values of a field comprised in payloads of the received packets;

tabulating the extracted values; and assigning a compression category to the field responsive to the tabulated values and the link ID assigned to the bin.

13. The network apparatus in accordance with claim 12, wherein the PPC is configured to generate a new dataset when the PPC detects at least one mismatch between the extracted field value and the computed value.

14. The network apparatus in accordance with claim 13, wherein the PPC is configured to generate a new dataset when the PPC detects a predetermined plurality of mismatches.

15. The network apparatus in accordance with claim 1 further comprising a log that receives and saves compressed packets generated by the PPC.

16. The network apparatus in accordance with claim 15, wherein the log is operable to release at least a portion of the saved compressed packets to the traffic shaper for transmission to the IDS hub, when triggered by a signal.

17. The network apparatus in accordance with claim 16 further comprising a computational unit that is operable to received copied packets and analyze the packets to detect a possible anomalous event, wherein the detection generates the signal for the log to release the at least a portion of the saved compressed packages.

18. The network apparatus in accordance with claim 1, wherein the packet is an industrial protocol packet, the network is an industrial control system (ICS) network, and the compressed packet is transmitted to an intrusion detection system (IDS) hub.

19. A method for evaluating and compressing a packet, the method comprising:

receiving a copy of a packet being propagated through a network, the packet comprising a source, destination, and a payload;

extracting a value of a field in the payload;

providing a computed value of the field based on the source and destination of the packet;

comparing the extracted value with the computed value;

compressing the field if the extracted value is the same as the computed value; and transmitting a compressed packet comprising the compressed field.

20. The method in accordance with claim 19, wherein providing the computed value comprises:

extracting the copied packet's source and destination and an identifier of the field;

querying a dataset to have assigned a compression category associated with the source, destination, and field identifier; and generating the computed field value with a function associated with the compression category.

* * * * *

UNITED STATES PATENT AND TRADEMARK OFFICE
CERTIFICATE OF CORRECTION

PATENT NO. : 9,854,069 B2  
APPLICATION NO. : 15/328975  
DATED : December 26, 2017  
INVENTOR(S) : Yehonatan Kfir et al.

Page 1 of 1

It is certified that error appears in the above-identified patent and that said Letters Patent is hereby corrected as shown below:

In the Claims

Column 12, Line 66, Claim 1 "destination" should be changed to --a destination--.

Column 13, Line 15, Claim 2 "a field identifier" should be changed to --with a field identifier--.

Signed and Sealed this  
Nineteenth Day of November, 2019

Andrei Iancu  
*Director of the United States Patent and Trademark Office*